United States Patent
Osborn et al.

(10) Patent No.: US 12,401,516 B2
(45) Date of Patent: Aug. 26, 2025

(54) SYSTEMS AND METHODS FOR CREATING SEED AND MASTER KEYS FOR BLOCKCHAIN WALLETS FROM USER BIOMETRICS

(71) Applicant: Capital One Services, LLC, McLean, VA (US)

(72) Inventors: Kevin Osborn, Newton Highlands, MA (US); Xiaoguang Zhu, New York, NY (US); Samuel Rapowitz, Roswell, GA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 433 days.

(21) Appl. No.: 18/094,202

(22) Filed: Jan. 6, 2023

(65) Prior Publication Data
US 2024/0235840 A1 Jul. 11, 2024

(51) Int. Cl.
*H04L 9/32* (2006.01)
*H04L 9/08* (2006.01)
*G06Q 20/36* (2012.01)

(52) U.S. Cl.
CPC .......... *H04L 9/3231* (2013.01); *H04L 9/0866* (2013.01); *H04L 9/0894* (2013.01); *H04L 9/3228* (2013.01); *H04L 9/3242* (2013.01); *G06Q 20/3678* (2013.01); *G06Q 2220/00* (2013.01)

(58) Field of Classification Search
CPC .............................. H04L 9/3231; H04L 9/0866
See application file for complete search history.

(56) References Cited

U.S. PATENT DOCUMENTS

| | | | | |
|---|---|---|---|---|
| 9,165,130 B2* | 10/2015 | Malpani | ........ | G06F 21/32 |
| 2005/0271258 A1* | 12/2005 | Rowe | ........ | G06V 40/1324 |
| | | | | 382/191 |
| 2007/0195998 A1* | 8/2007 | Le Saint | ........ | G06F 21/34 |
| | | | | 340/5.8 |
| 2011/0022847 A1* | 1/2011 | Duffy | ........ | G06V 40/1365 |
| | | | | 713/182 |
| 2012/0057763 A1* | 3/2012 | Horng | ........ | G06V 10/462 |
| | | | | 382/115 |

(Continued)

*Primary Examiner* — Ponnoreay Pich
(74) *Attorney, Agent, or Firm* — HUNTON ANDREWS KURTH LLP

(57) ABSTRACT

Systems and methods are directed to optimizing a security and recoverability trade-off generally associated with cryptocurrency master key storage. Exemplary embodiments provide a biometrically derived cryptographic seed using a measurement of one or more scale invariant biometric attributes associated with a user. The measured user biometric data is then processed into a repeatable biometric identifier and formatted into a (biometric) cryptographic seed, for derivation of a master extended private key, which may be stored in an HD wallet or used dynamically to conduct a blockchain transaction. The biometric seed and master key generation process may be facilitated by a mobile application responsive to a readout of biometric data from sensors integrated/associated with the mobile device. The captured biometric data may be cryptographically combined with a user-inputted password and/or an authentication data record wirelessly retrieved from an OTP card, to generate a cryptographic seed with greater security attributes.

20 Claims, 8 Drawing Sheets

(56) References Cited

U.S. PATENT DOCUMENTS

| | | | |
|---|---|---|---|
| 2014/0139318 A1* | 5/2014 | Malpani | G06F 21/32 |
| | | | 340/5.82 |
| 2016/0269182 A1* | 9/2016 | Sriram | H04L 9/0869 |
| 2017/0048209 A1* | 2/2017 | Lohe | G06Q 20/3829 |
| 2019/0022085 A1* | 1/2019 | Zhou | A61K 31/485 |
| 2019/0220859 A1* | 7/2019 | Weight | H04L 9/321 |
| 2020/0234285 A1* | 7/2020 | Vanham | G06Q 20/0658 |
| 2022/0121869 A1* | 4/2022 | Miura | G06T 7/11 |
| 2022/0191014 A1* | 6/2022 | Wagner | H04L 63/0861 |
| 2023/0224150 A1* | 7/2023 | Serguieva | H04L 9/3231 |
| | | | 713/155 |
| 2024/0235840 A1* | 7/2024 | Osborn | G06Q 20/065 |

* cited by examiner

SYSTEMS AND METHODS FOR CREATING SEED AND MASTER KEYS FOR BLOCKCHAIN WALLETS FROM USER BIOMETRICS

FIELD OF THE DISCLOSURE

The present disclosure is generally related to cryptocurrency transaction implementation with blockchain wallets, and more specifically to optimizing management of cryptographic master keys associated with blockchain transactions.

BACKGROUND

Cryptographic and block chain based transactions generally rely on elliptic curve signature algorithms (ECDSA) for generation of a master public/private key pairs that are used for identification (e.g., tracking) and validation of a blockchain-implemented transaction, such as a cryptocurrency-based transactions. The master private key (from which a master public key is derived) provide access to a user's cryptocurrency holdings allowing a user to send and receive cryptocurrencies. Cryptocurrency wallets are generally used for digital storage of the master private keys. Although cryptocurrency wallets typically do not store cryptocurrency holdings of a user (rather, the holdings typically exist on the blockchain thus such applications are often referred to as blockchain wallet), they do store the cryptographic master private key for providing access to the use's digital currency.

In cryptocurrency processing, tracking and validation of distinct blockchain transactions requires a unique cryptographic key pair (e.g., a public and private key pair) generated for each distinct blockchain transaction. This would require that a blockchain wallet be backed up every time a transaction is conducted. In order to reduce the storage requirement associated with blockchain implemented cryptocurrency transactions, a hierarchical deterministic (HD) wallet enables all private and public key pairs to be generated from a single source (e.g., an extended master private key) which may then be used to generate a plurality of unique child public/private key pairs. The child key pairs may all be related to the master key in a same deterministic way. In this way, each child key in the wallet may generate its own child keys represented in a hierarchical format arrangement with the extended master private key as the root node. As such, a loss of a master private key may result in a loss of access to any cryptocurrency holding associated with the particular private key. Therefore safe storage of the private key as well as the safe storage of the medium storing the private key such as a hardware wallet, is a critical security factor. Accordingly, hardware wallets such as thumb-drive device storing the key may be kept in a safe place and only connected to a computer for conducting a crypto-currency transaction.

In hierarchical deterministic wallets, a single seed may be used to create a cryptographic master private key, which may be re-generated from the same seed in a recovery attempt. Therefore, it would be important for the seed data to be both securely and recoverably stored so as to be inaccessible to unauthorized parties while remaining accessible to the user for recovery in case the key storage device is lost and/or damaged. One recovery option is to back up the seed data on a separate storage medium. However, while this may improve recovery accessibility of the key, it negatively impact access/storage security associated with it. A more secure approach may correspond to backing up distinct portions of the seed data on separate storage mediums to reduce probability of unauthorized access to the complete seed data, thus improving its access/storage security. However, with the latter approach, the recovery accessibility of the key-generating seed data is reduced.

Therefore, in management of cryptographic master keys, there exist a trade-off between security and accessibility requirements for the storage of cryptographic seed data in a secure, yet easily recoverable and accessible way (e.g., in case of loss or damage to the key storage medium). This and other deficiencies exist. Accordingly, there is a need for a secure, easily recoverable, and accessible cryptographic storage for optimizing management of cryptographic master keys associated with blockchain transactions.

SUMMARY OF THE DISCLOSURE

Embodiments of the present disclosure provide a system, method, and non-transitory computer-accessible medium having stored thereon computer-executable instructions for implementing a biometrically derived seed computation process to streamline management of master cryptographic (extended) keys in a hierarchical deterministic (HD) wallet. In accordance to one aspect of the proposed solution, both access-security and recoverability attributes associated with effective storage and management of cryptocurrency master keys are improved. The proposed solution may comprise: performing a measurement of one or more scale invariant biometric data associated with a user, and, computing a repeatable biometric number from the measurement of one or more scale invariant biometric data associated with the user. Additional processes directed to formatting the repeatable biometric number into a cryptographic seed may be further performed to create a biometric cryptographic seed from which one or more master cryptographic keys may be generated. An extended master private key may then be computed from the biometric cryptographic seed. In some embodiment the cryptographic process for generating a master key from the biometric cryptographic seed may involve processing the biometric cryptographic seed with a hash function. The scale invariant input biometric measurements, required for generating the repeatable biometric number may be performed by one or more biometric sensors on a stand-alone device and/or integrated on a mobile device associated with the user.

In accordance to some embodiments of the present disclosure the biometric cryptographic seed may generated by one or more mobile applications stored on the user mobile device that may also be used for the measurement of one or more scale invariant biometric data. The cryptographic computation of an (extended) master private key (e.g., for use with HD wallets) from the biometrically derived seed value may be also performed by one or more mobile application running on the user mobile device. The computations may be performed in part and/or in whole by the one or more mobile applications and/or one or more server-side applications, stored on a remote server, and communicatively coupled with the one or more mobile applications, via a network.

The biometrically-derived cryptographic master keys, generated in accordance to the aforementioned process, may be stored on one or more HD wallets to be used in conducting a blockchain and/or cryptocurrency transaction. In some embodiments the biometric cryptographic seed may be dynamically generated by the one or more mobile application to derive a new master cryptographic key for each distinct blockchain transaction. The master cryptographic key may then be deleted upon completion of the blockchain transaction. Thus obviating a need for a HD wallet or other secure cryptographic key storage devices for conducting cryptocurrency transactions.

In some embodiments, the measured user biometric data may be combined with other identification data types such as a knowledge-based data (e.g., a user password or PIN inputted via the user mobile device) and/or a secret authentication data (e.g., user identifying data securely stored on a One Time Password (OTP) card and wirelessly transmitted to and/or read by the user mobile device) in order to generate a highly secure hybrid (multi-factor) cryptographic seed which integrates user biometric data, a user-known (PIN) data and a user-unknown (secret) data into a repeatable seed identifier for derivation of a master cryptographic private key.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the proposed solution is directed to a system and process for computation of an extended master private key based on a biometrically-derived seed data, which is derived from measurements of one or more target biometric features associated with a user. A repeatable user biometric signature may then be computed from the user biometric data obtained via measurements of one or more scale invariant target biometric features of the user. The scale invariant user biometric data may also be obtained from an image which captures one or more biometric attributes associated with the user, and/or an audio file of a user's voice.

The repeatable user biometric signature may be used in combination with other easily recoverable data quantities, such as a user-known confidential data (e.g., user PIN) and/or a readily accessible user-unknown (secret) data stored on contactless card, to enhance the cryptographic security of the computed master (extended) private key, generated from easily recoverable data components that are readily accessible to the user (e.g., user biometric data, a user password, and a contactless authentication card.)

Figure 1:
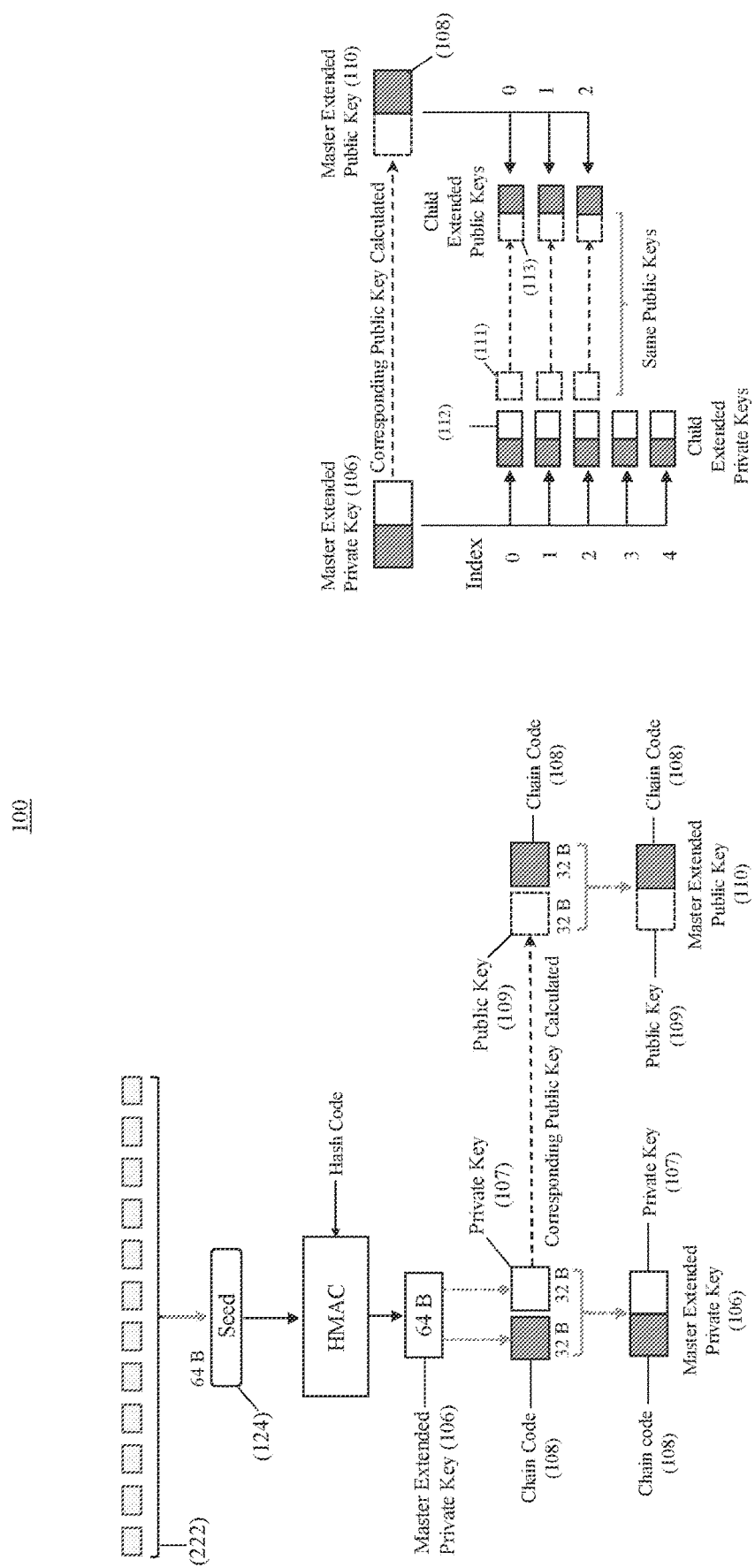
FIG. 1 illustrates an operational overview of seed driven extended master key and child key generation for implementation of cryptocurrency transactions.

FIG. 1 illustrates an overview of an exemplary process associated with generation of HD wallet extended master private key as well as the hierarchical generation of child private/public key pairs. With reference to the illustration 100, a 64 bytes randomly generated number is used as an initial seed (124) for computation of a master extended private key (106), for an HD wallet. The computation may involve processing the 64 byte seed with a cryptographic hash function (e.g. Hashed Message Authentication Code (HMAC) generation) to generate a 64 byte (extended) master private key (106) as shown in FIG. 1. The resulting 64 byte number (106) may be divided into 32 bytes of private key (107) and 32 byte of associated chain code (108) which is used for generating the child private and public key pairs (index enumeration 0-4). As shown in the example 100 of FIG. 1, appending the chain code (108) of a private key (107), to a corresponding public key (e.g., public key 109) creates a master (extended) public key (110). In the process shown in FIG. 1, a child public key (e.g., 111) derived from a child private key (112) (e.g., with reference to enumeration index 0) may be validated without knowledge of the corresponding private key (112) as it corresponds to the child public key (113) corresponding to enumeration index 0 of the master extended public key (110).

FIG. 1 also illustrates an exemplary scheme used to create a repeatable 64 byte number (e.g., the seed) to be encrypted into a 64 byte (extended) private master key (106), that may be generated, for example, at the initiation of an HD wallet application. As described above, the seed may correspond to a random 64 bytes number based on which the master (extended) private key (106) may be created. The 64 bytes seed data is generally provided in a hexadecimal format. However, to simplify its recovery for a user, the seed data may also be provided as a mnemonic phrase (222). The mnemonic phrase, corresponding to a sequence of randomly selected words is then cryptographically processed into a 64 bytes of cryptographic seed data (124). The seed is then used in a cryptographic process to generate the private (extended) master key (106) as described above. As further described above, a performance trade-off exists between the recovery accessibility and storage security of the seed mnemonic elements. Accordingly, an improved embodiments that obviates some the deficiencies associated with the storage of the seed identifier and/or its mnemonic elements, is shown in FIG. 2.

Figure 2:
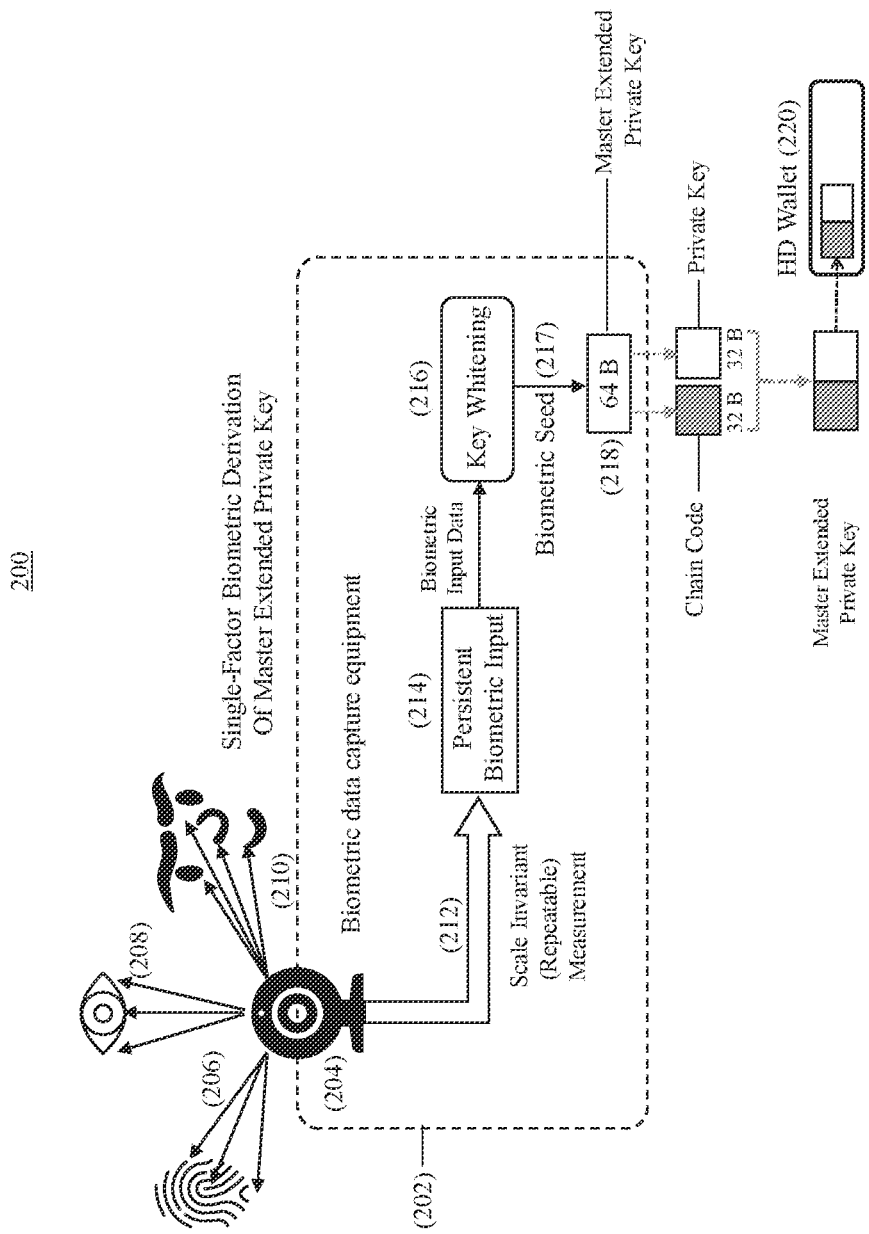
FIG. 2 illustrates a process for single-factor biometric based deviation of a master extended private key for enabling cryptocurrency transactions, in accordance with exemplary embodiments of the present disclosure.

FIG. 2 illustrates an improved approach for generation of the cryptographic seed that significantly simplifies the key generation and/or recovery process as well as streamlining the key storage security implementation. The aforementioned embodiment, as illustrated in FIG. 2, is directed to a biometric-based cryptographic seed generation for computing a master extended private key (218) as exemplified by process block (202). Accordingly, the exemplary process (202) implements a single-factor master key derivation process based on a biometrically-derived seed data.

Referring back to FIG. 2, real-time user biometric data may be captured and/or measured by the one or more biometric input (acquisition) devices as illustrated by sensors (204). In some embodiments, the measured biometric data value(s) may be associated with a pre-determined biometric attribute and/or feature of a user. For example, with reference to FIG. 2, the biometric input data may correspond to measurement of one or more (persistent and/or scale invariant) fingerprint features (206). The biometric data acquisition device (204) may also be configured for measurement of one or more (persistent) eye/retinal features (e.g., biometric input data 208). As illustrated in the exemplary schematic (200), the biometric input data may also correspond to measurement of one or more (persistent) facial features (210).

In some embodiments the scale invariant biometric data may be obtained from an image which capture one or more biometric attributes associated with the user. In some instances, the biometric data may comprise at least one audio file of a user's voice.

In accordance to an embodiment of the proposed solution, a key property of a target biometric feature, selected for measurement as input biometric data, is scale invariance. This means that any associated alterations in one or more physical characteristics of the user (e.g., age, height, weight, etc.) does not alter the measured property of the target biometric feature, and by extension, the repeatability of the input biometric data (212). In some embodiments of the present disclosure, scale invariance of the biometric measurement and repeatability of the input biometric data value may be further improved by associating a target biometric feature to a ratio of two or more disparate biometric measurements that produces a repeatable quantity. For example, a target biometric input may correspond to a ratio of distance between the user's pupils and the distance between the tip of the user's nose and chin. Such a biometric measurement process may involve a biometric data acquisition device and/or process to identify and map the prescribed facial points and measure the inter-connecting distance based on, for example, the projected an/or computed facial contour lines constituting the measured path between the points. As such, scale invariant mathematical relationships such as ratio of distinct biometric values and/or measurement of relative distances associated with one or more biometric feature may be used, in accordance to some embodiments of the present disclosure, to reliably generate a repeatable (e.g., within an acceptable margin of accuracy) input biometric data values (e.g., scale invariant biometric measurement 212).

Accordingly, in contrast to the general approach of generating a cryptographic seed (e.g., for conducting secure cryptocurrency transactions with HD wallets) which correspond to a random starting point, the described embodiment involving measurement of a (scale invariant) target biometric feature(s) and generation of a repeatable biometric input (e.g., persistent numeric input 214) is not based on a random starting process, rather it is derived from a repeatable physical characteristic measurement of the user which is readily accessible for possible key recovery. The proposed embodiments, thus significantly improve the trade-off between security and accessibility attributes associated with cryptocurrency master keys.

Referring back to FIG. 2, the (scale invariant) biometric measurement (212) may be mathematically transformed and/or mapped to a persistent (repeatable) data value constituting the persistent (e.g., repeatable) biometric input data (214). The repeatable biometric input data (214) may then be processed by one or more mathematical and/or cryptographic techniques (e.g., key whitening process 216) to convert the static biometric input data (e.g., in terms of number and distribution of bits) into a cryptographically compatible biometric seed (217). The biometric seed (217) may then be used, for example in a cryptographic process, to generate an (extended) private master key (218) from which the public (extended) master key and all other child private/public keys may de derived as described earlier. The generated master private key (218) may then be stored in an appropriate storage device such as a HD wallet (220).

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the systems and devices described herein and/or other computer hardware arrangements.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Figure 3:
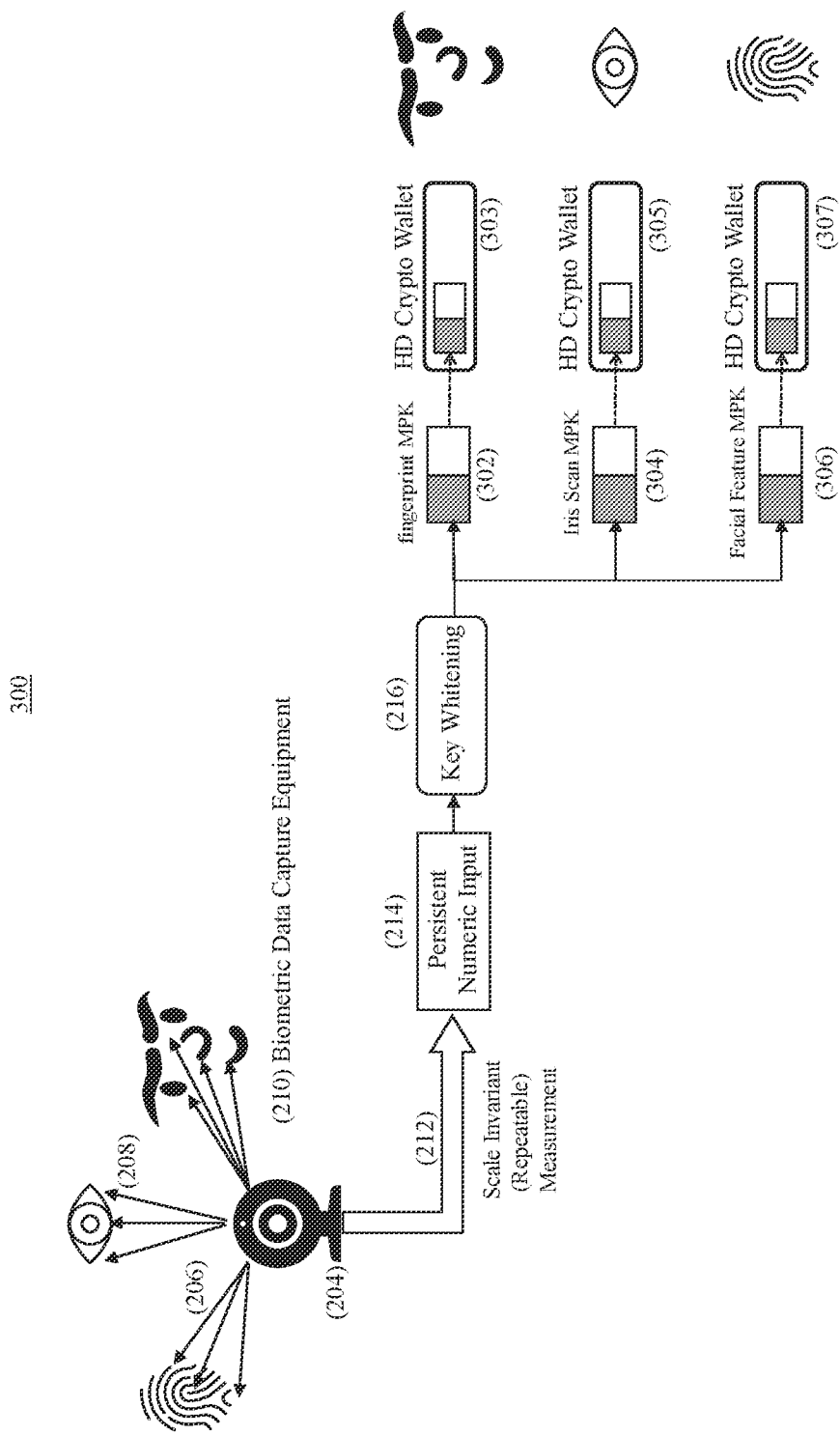
FIG. 3 illustrates an embodiment for generating distinct biometric seeds, based on distinct biometric input data types, for use with distinct HD wallets, in accordance with exemplary embodiments of the present disclosure.

FIG. 3 illustrate an exemplary embodiment (300) relating to a biometrics-based master key generation process involving several distinct biometric input types for generating distinct biometric seeds each of which may be stored and used with a distinct HD wallet having a distinct public key address. For example, with reference to exemplary embodiment 300, fingerprint biometric data 206 may be acquired to generate a unique biometric (extended) master private key (302) to be stored and used with the HD wallet (303). Furthermore, in accordance to the example provided, retinal scan data 208 may be acquired for generation of a unique master (extended) private key (304) for use with (and secure storage on) the HD wallet (305). Additionally, facial biometric data 210 may be acquired for generation of a unique master (extended) private key (306) for use with (and secure storage on) the HD wallet (307).

Figure 4:
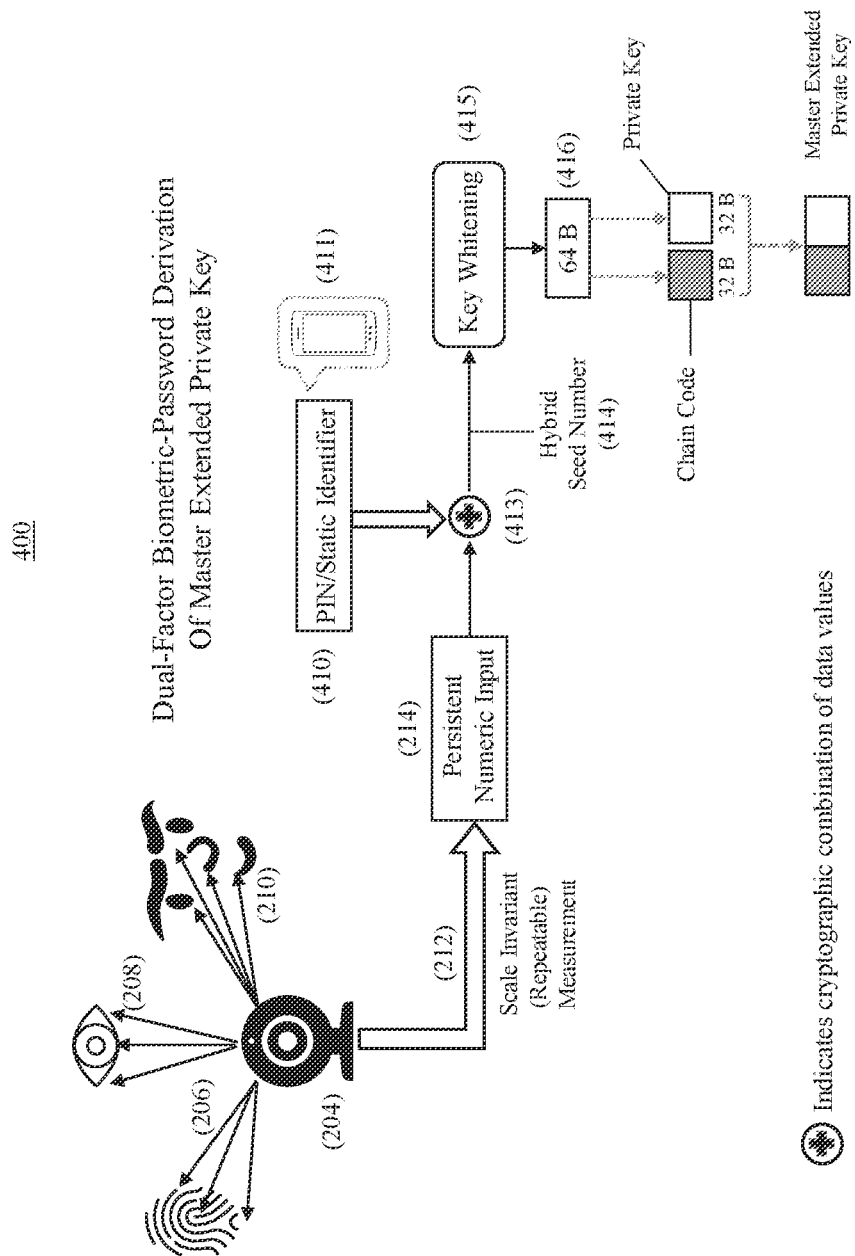
FIG. 4 illustrates a process for dual-factor biometric-password derivation of master extended private key, in accordance with exemplary embodiments of the present disclosure.

FIG. 4 illustrates an exemplary dual-factor cryptographic seed generation process (400) which utilizes a hybrid input data including both a user biometric data (selected, for example from one or more biometric data types 206, 208 and 210, measured with sensor 204) and a knowledge-based data. In the exemplary implementation of the biometric-password hybrid derivation process (400), the knowledge-based data may correspond to a user personal identification number (PIN), a user password, and/or other static identifier (410) which may be retrieved, for example, via a prompted notification transmitted to a corresponding application running on a user mobile device (411). In some embodiments, the corresponding mobile application (411) may be in communication with the biometric data acquisition sensors (204) as well as the cryptographic seed formatting process. In some embodiments, the biometric data acquisition sensors (204) and cryptographic seed formatting processes may be integrated onto the mobile device (411).

With reference to the exemplary embodiment 400, illustrated in FIG. 4, the mobile device (and/or mobile applications running on the mobile device) may be operative to transmit a user provided PIN and/or password (e.g., inputted, via an application user interface provided on the mobile device) to be cryptographically combined, as shown by process 413, with the repeatable biometric input data (214). The resulting hybrid seed number 414 may then processed in accordance to one or more cryptographic format requirements (e.g., key whitening process represented by process block 415) to generate a master (extended) private key (416). In some embodiments, a first portion of the hybrid cryptographic seed may be derived from the measurements of one or more scale invariant (repeatable) biometric data, while a second portion of the hybrid cryptographic seed may be derived from the user provided input data (e.g., user PIN/password). The illustrated embodiment (400), may introduce an additional layer of security to the single-factor biometric seed generation process, described in FIG. 3, by incorporating a knowledge-based data (e.g., a user-provided PIN/password) into the biometric seed generation process. However, the user-provided PIN/password may then be required in addition to the user biometric data to recover a lost or damaged master private key.

Figure 5:
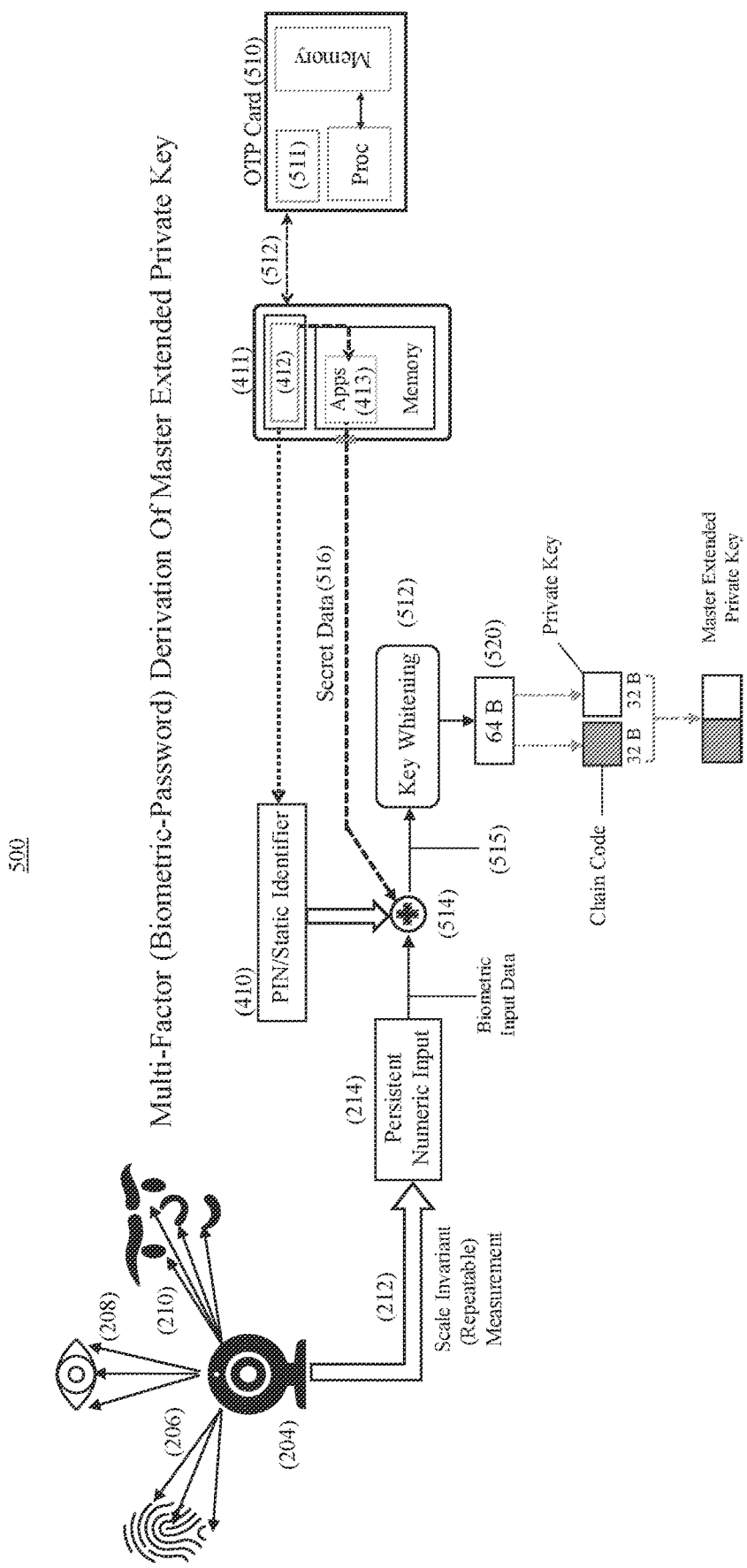
FIG. 5 illustrates a process for multi-factor biometric-password-secret data derivation of master extended private key, in accordance with exemplary embodiments of the present disclosure.

FIG. 5 illustrates an exemplary embodiment (500) involving a multi-factor derivation and/or recovery process associated with a repeatable cryptographic seed. The exemplary multi-factor cryptographic seed generation process (500) combines, a static user biometric identifier (e.g., repeatable biometric input 214), computed, for example, form one or more scale invariant biometric measurements 206, 208 and 210, and a knowledge-based data (e.g., user-provided PIN/password 410), with a secret data identifier/record (516), using for example, a cryptographic process (514), to generate a multi-factor seed number (515) for computation and/or recovery of a cryptocurrency master key. The secret data record (516) may correspond to user identifying information stored, for example, on a One Time Password (OTP) authentication card (510) and read via a Near Field Communication (NFC) transmission (512) by a reader (412) of the user mobile device (411) and/or the mobile application (413).

Thus in accordance to the exemplary embodiment 500, a repeatable user biometric signature (e.g., persistent numeric input 214) in combination with a user-known confidential data (e.g., user PIN/static identifier 410) as well as a readily accessible user-unknown (secret) data (516) may be cryptographically combined, as shown by process 514, to generate a master (extended) private key (520) that would be exceedingly hard to hack while having recovery data components that are readily accessible to the user (e.g., user biometric data, a user password, and a One-Time Password (OTP) authentication card.) In some embodiments, the OTP authentication card may correspond to a uniquely configured contactless card (510) with an integrated Near Field Communication (NFC) tag (511) storing NFC transmittable user authentication data that may be readable, by a corresponding mobile application (413).

Figure 6:
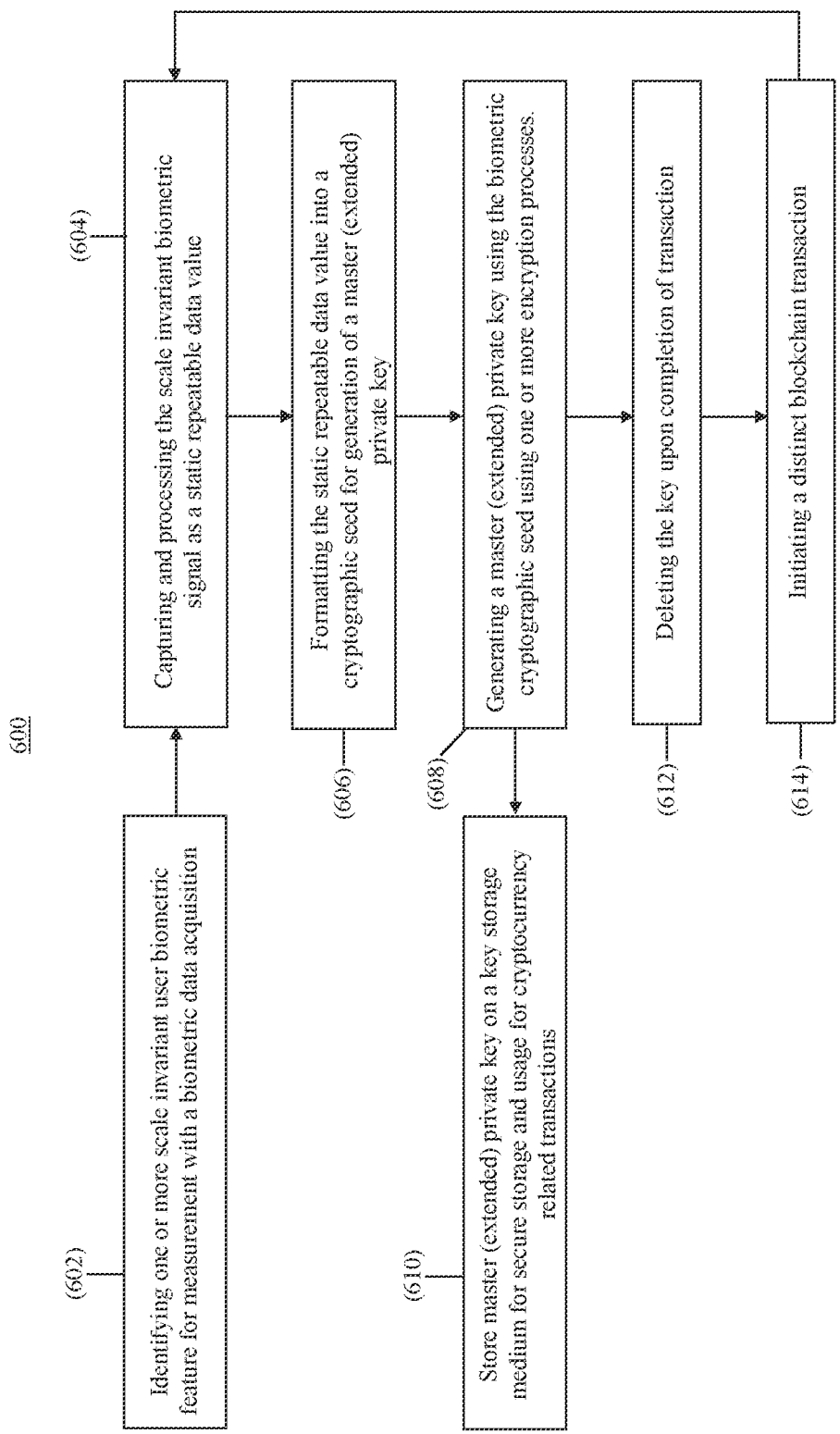
FIG. 6 illustrates a flowchart of an exemplary process for biometric-driven generation and recovery of master cryptocurrency keys, in accordance with exemplary embodiments of the present disclosure.

FIG. 6 illustrate an exemplary operational flowchart (600) for biometric-based generation of a cryptographic master key for use with HD wallets. The exemplary process (600) may be initiated at step 602 by identifying and/or determining a scale invariant user biometric feature for measurement with one or more biometric sensors. The scale invariant user biometric signal is then captured and/or measured (e.g., by a biometric sensor) and processed as a static data value (e.g., a repeatable biometric number) at step 604. At step 606, the repeatable biometric number, generated at step 604, is formatted into a seed value with good cryptographic attributes. At step 608, the resulting biometric seed, generated at step 606, may be used in a cryptographic process to generate a master (extended) private key for use, for example, with an HD wallet in conducting cryptocurrency transactions.

In accordance to some embodiments, the a master (extended) private key generated, for example, in step 608 may be stored on a blockchain wallet (e.g., HD wallet) and used for cryptocurrency transactions as shown by step 610. Other embodiments of the exemplary process (600) may involve dynamic generation of a new master private key for each distinct blockchain transaction. In this case, upon completion of step 608, the operation flow may move to step 612 wherein a biometric master private key is deleted upon completion of a corresponding blockchain transaction. The deletion of the private master key at the end of cryptocurrency transactions improves the security of the process. In such embodiments, initiation of a new blockchain transaction, as shown in step 614, may correspond to generation of a new biometric seed and master private key, involving, for example, operation steps 604-608 associated with the exemplary flowchart (600).

Figure 7:
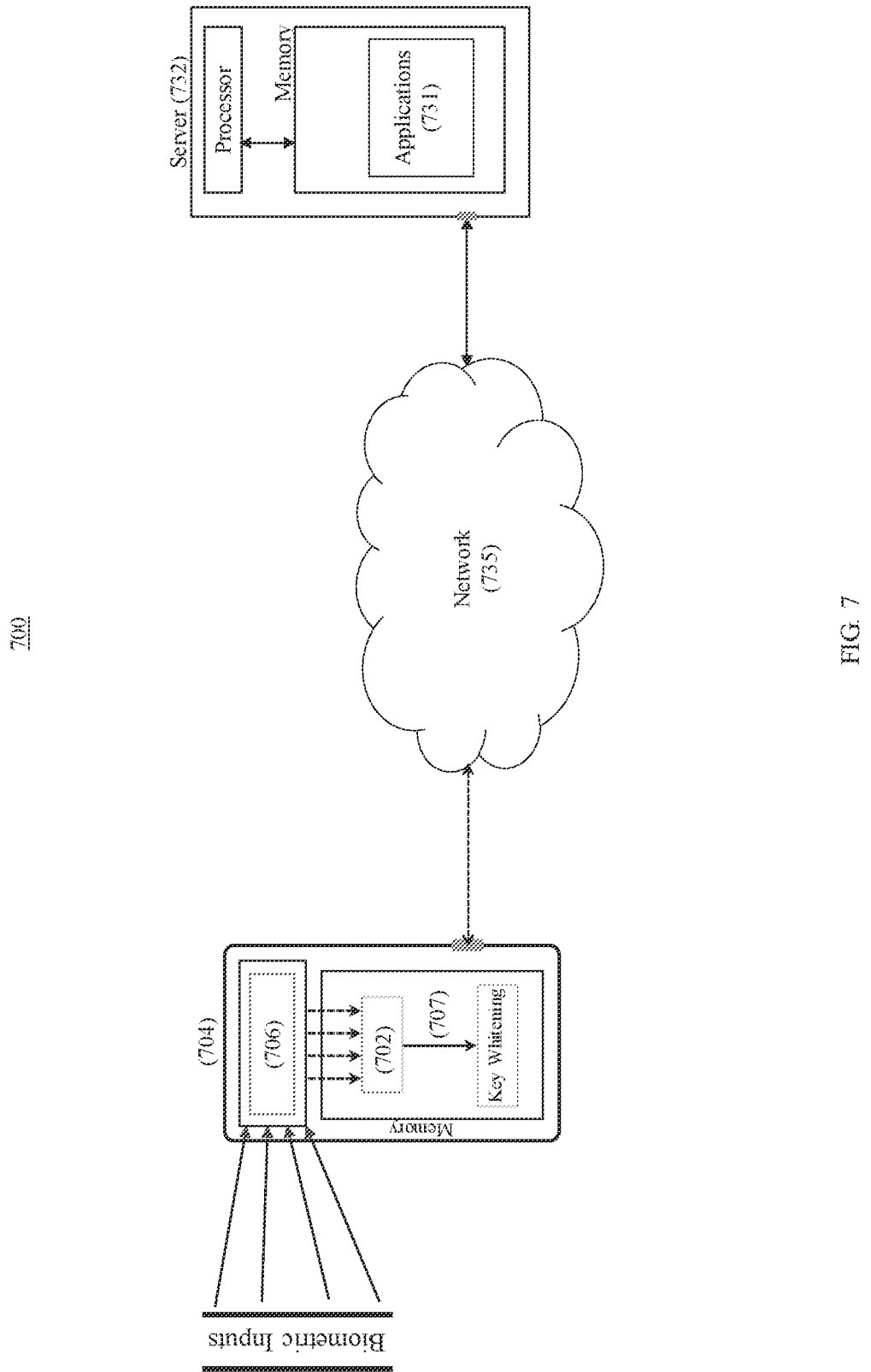
FIG. 7 illustrates a exemplary system for dynamic generation of one-time use biometric seeds, in accordance with exemplary embodiments of the present disclosure.

In some of the scenarios described above, a biometric cryptographic seed and/or master key may be computed by one or more mobile applications running on a user mobile device. However, there may be security concerns regarding the storage of the computed cryptographic seed and/or master key on the user mobile device. The exemplary schematic (700) for a mobile device based implementation of biometric seed and/or master keys generation process features a storage-less dynamic generation of transaction-specific cryptocurrency master keys. With reference to FIG. 7, an on-demand computation of a biometric-based cryptographic master keys may be initiated by application 702, running on a user mobile device (704). The mobile application (702) may then initiate measurement of one or more user biometric data, using one or more integrated sensors (706). The biometric measurement data may then be processed by the mobile application (702) to generate a repeatable (static) biometric number (707). The repeatable biometric number may further be processed (e.g., through application of key whitening routines) to generate a new biometric cryptographic seed for deriving a new master private cryptographic key.

Accordingly, in the exemplary implementation 700, a master private keys may be deleted upon completion of a corresponding blockchain transaction, to eliminate storage security concerns, and a new biometric master private key dynamically generated (e.g., by the mobile application (702)) for each new cryptocurrency and/or blockchain transaction. In other embodiments of the present disclosure, the generated biometric master private key may be stored on a HD wallet and used therewith to conduct cryptocurrency transaction. The computations associated with cryptographic (extended) master key generation process based on a biometric seed, as described above, may be performed in parts and/or in whole by one or more server-side applications (731) running on a remote server (732) and communicatively coupled to the mobile application (702) via, for example, network (735).

According to some embodiments of the present disclosure one or more aliveness check may be conducted on the biometric data being measured to ensure authenticity of the biometric input. In some embodiment a liveness test may be further accompanied with a gesture-based signal capture to ensure authenticity of the input biometric data. In some embodiments liveness checks may capture dynamic gestures such as blinking. Some embodiments may utilize biometric sensors with multi-spectral imaging of a target biometric attribute to verify various biometric signatures associated with a user (such as, for example, infra-red mapping of physiological features).

Figure 8:
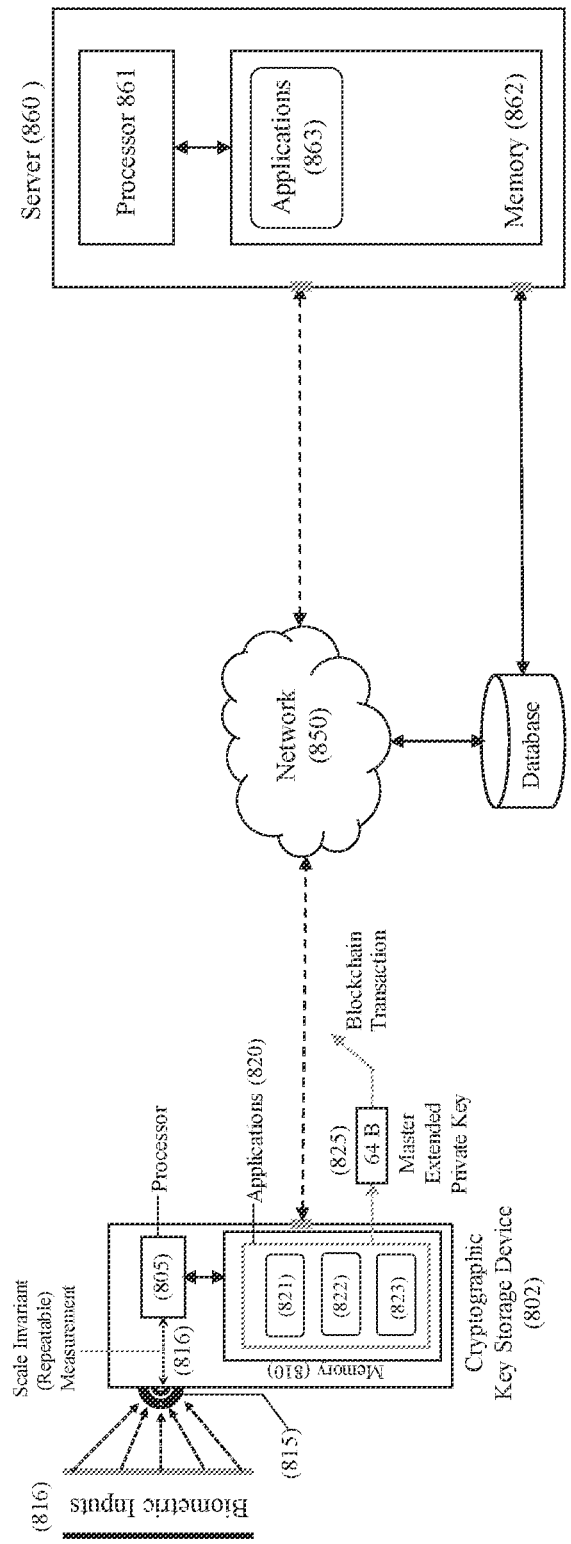
FIG. 8 illustrates a block diagram of an exemplary cryptographic key generation and recovery system, in accordance with exemplary embodiments of the present disclosure.

FIG. 8 illustrates an exemplary biometric cryptographic key management system 800 featuring a cryptographic key storage (CKS) device (802) for generating a biometrically derived cryptocurrency master key based on one or more input biometric data associated with a user.

The CKS device (802) may be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The CKS device (802) also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The CKS device (802) may include one or more processor (805) and one or more memory components (810). The CKS device may further comprise one or more biometric input devices and/or sensors (815) for facilitating acquisition of one or more biometric measurement (816) associated with the user. The one or more memory components (810) may comprise applications 820, for example, for performing one or more operations associated with acquisition of biometric user data and processing of the acquired biometric data into a repeatable biometric number. Accordingly, applications 820 may comprise a process (821) for processing the incoming biometric data (816), corresponding, for example, to a measurement of a scale invariant physical user attribute. Process 821 may use the biometric data (816) as one or more inputs to generate a static (persistent) and repeatable biometric number (e.g., repeatable numeric output associated with user biometric data). Application 820 may further comprise a process (822) for formatting the static biometric number and/or the one or more raw biometric data values, into a biometric-based seed value with mathematical properties suitable for cryptographic master key generation. Application 820 may also comprise a process (823) for computing, from the biometric-based seed value, a master (extended) private key and a corresponding master (extended) public key, as well as associated child private and public key pairs. In some embodiments, the one or more processors (805) may be configured to grant access to the CKS device (802) based on verification of one or more user authentication data provided by a user.

According to an aspect of the present disclosure, the master cryptographic key may be generated by formatting the biometrically-derived repeatable static number into a 64 byte seed value with suitable attributes (e.g., length, bit distribution characteristics) for generation of a cryptographic (extended) master key (825), which may then be used for operating a blockchain wallet. In some embodiments, the master (extended) cryptographic key (825), may be stored on a hierarchical deterministic (HD) wallet for conducting cryptocurrency transactions therewith.

Thus, as described in accordance to the aforementioned embodiment, the CKS device (802) may enable a user to conduct blockchain transactions via their biometric inputs (which generates the master cryptographic keys from a biometric seed). In some embodiments, the cryptographic key storage device may be configured to incorporate other inputs (in addition and/or instead of user biometric data), such as a an authentication token, and/or a seed phrase, in the computation of a cryptographic (extended) master key (s). A variety of hash functions may be used to generate, from the extended master key, a plurality of unique private/public key pairs, each pair corresponding to a distinct cryptocurrency transaction.

The cryptographic key management system (800) may include one or more cryptographic key storage devices 802. In some embodiments, cryptographic key storage device may be a general processing computer, and in others in may be a specialized computing device with components and functions described herein designated for biometric-based generation and secure storage of cryptographic keys for conducting cryptocurrency blockchain transactions. With reference to example (800), the cryptographic (extended) master key (825) may be readily recovered from user's biometric data in an event of a lost and/or damaged CKS device.

In some embodiments, one or more of the forementioned computations, for the generation and/or recovery of a master (extended) cryptographic keys from one or more user biometric data, may be executed, in part or in whole, by one or more applications (820) and/or one or more server-side applications (863) running on a corresponding application server (e.g., server 860) communicatively coupled to the CKS device (802) across network (850).

The cryptographic key storage system 800 can include one or more network 850. In some examples, network 850 can be one or more of a wireless network, a wired network or any combination of wireless network and wired network, and can be configured to connect to any one of components of system 800. In some examples, network 850 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 850 can include, without limitation, telephone lines, fiber optics, IEEE Ethernet 902.3, a wide area network, a wireless personal area network, a LAN, or a global network such as the Internet. In addition, network 850 can support an Internet network, a wireless communication network, a cellular network, or the like, or any combination thereof. Network 850 can further include one network, or any number of the exemplary types of networks mentioned above, operating as a stand-alone network or in cooperation with each other. Network 850 can utilize one or more protocols of one or more network elements to which they are communicatively coupled. Network 850 can translate to or from other protocols to one or more protocols of network devices. Although network 850 is depicted as a single network, it should be appreciated that according to one or more examples, network 850 can comprise a plurality of interconnected networks, such as, for example, the Internet, a service provider's network, a cable television network, corporate networks, such as credit card association networks, and home networks.

System 800 can further comprise one or more servers 860. In some examples, the server 860 can include one or more processors 861 coupled to memory 862. The server 860 can be configured as a central system, server or platform to control and call various data at different times to execute a plurality of workflow actions. The server 860 can be configured to connect to any component of system 800 via network 850. The server 860 can be a dedicated server computer, such as bladed servers, or can be personal computers, laptop computers, notebook computers, palm top computers, network computers, mobile devices, wearable devices, or any processor-controlled device capable of supporting the system 800. While FIG. 8 illustrates a single server 860, it is understood that other embodiments can use multiple servers or multiple computer systems as necessary or desired to support the users and can also use back-up or redundant servers to prevent network downtime in the event of a failure of a particular server.

The server (860) can be in data communication with the processor (805). For example, server 860 can be in data communication with processor 805 of the CKS device (802) via one or more networks (850). The CKS device (802) may transmit one or more requests to the server (860). The one or more requests can be associated with retrieving data from the server (860). The server (860) can receive the one or more requests from any component of CKS device. Based on the one or more requests from, for example the processor (805), the server (860) can be configured to retrieve the requested data. The server (860) can be configured to transmit the received data to the processor (805) of the CKS device (802), the received data being responsive to one or more requests.

In some examples, the server 860 can be a dedicated server computer, such as bladed servers, or can be personal computers, laptop computers, notebook computers, palm top computers, network computers, mobile devices, wearable devices, or any processor-controlled device capable of supporting the system 800. While FIG. 8 illustrates a server 860, it is understood that other embodiments can use multiple servers or multiple computer systems as necessary or desired to support the users and can also use back-up or redundant servers to prevent network downtime in the event of a failure of a particular server.

The server 860 can include a processor 861. The processor 861 can be, for example, one or more microprocessors. The processor 861 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 860 can include an application comprising instructions for execution thereon (not shown). For example, the application can reside in memory 862 of server 860 and can comprise instructions for execution on the server 860. The application of the server 860 can be in communication with any components of system 800. For example, server 860 can execute one or more applications that enable, for example, network and/or data communications with one or more components of system 800 and transmit and/or receive data. Without limitation, the server 860 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server (860) also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server (860) can include processing circuitry and can contain additional components, including processors, memories, error and parity/CRC checkers, data encoders, anticollision algorithms, controllers, command decoders, security primitives and tamperproofing hardware, as necessary to perform the functions described herein. The server (860) can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's user device that is available and supported by the user's user device, such as a touch-screen, keyboard, mouse, cursor-control device, touch-screen, microphone, digital camera, video recorder or camcorder. These devices can be used to enter information and interact with the software and other devices described herein.

System 800 can include one or more databases 135. The database 135 can comprise a relational database, a non-relational database, or other database implementations, and any combination thereof, including a plurality of relational databases and non-relational databases. In some examples, the database 135 can comprise a desktop database, a mobile database, or an in-memory database. Further, the database 135 can be hosted internally by any component of system 800, such as the First issuer system 105, or server (860), or the database 135 can be hosted externally to any component of the system 800, such as the First issuer system 105, or server 860, by a cloud-based platform, or in any storage device that is in data communication with the First issuer system 105 and server 860. In some examples, the database 135 can be in data communication with any number of components of system 800. For example, the server 860 can be configured to retrieve the requested data from the database 135 that is transmitted by the processor 805. Server 860 can be configured to transmit the received data from database 135 to the processor 805 via network 850, the received data being responsive to the transmitted one or more requests. In other examples, the processor 805 can be configured to transmit one or more requests for the requested data from database 135 via network 850.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A cryptographic key storage device, comprising:
a processor, one or more biometric data acquisition devices, and a memory containing one or more applications;
wherein the processor is configured to:
authenticate a user,
compute a repeatable biometric number from a measurement of one or more scale invariant biometric data associated with the user,
format the repeatable biometric number into a cryptographic seed, to generate a biometric cryptographic seed, and
derive a private extended master key from the biometric cryptographic seed.

2. The device of claim 1, wherein the one or more scale invariant biometric data associated with the user further comprises a liveness test data.

3. The device of claim 1, wherein the one or more scale invariant biometric data are obtained from an image capturing one or more biometric attributes associated with the user.

4. The device of claim 1, wherein the one or more scale invariant biometric data comprise at least one audio file of a user's voice.

5. The device of claim 1, wherein the processor is further configured to derive a first portion of a cryptographic seed from the measurement of one or more scale invariant biometric data and a second portion of the cryptographic seed from a user provided input data.

6. The device of claim 5, wherein the user provided data is acquired via a mobile application running on a mobile device associated with the user.

7. The device of claim 1, wherein the processor is further configured to grant access to the cryptographic key storage device based on verification of one or more user authentication data.

8. The device of claim 1, wherein the processor is further configured to generate a distinct biometric cryptographic key based a type of measured biometric data.

9. The device of claim 1, wherein the measurement of one or more scale invariant biometric data associated with the user comprises multi-spectral imaging of a target biometric attribute.

10. A method of biometrically derived cryptographic seed computation for management of a master private key in hierarchical deterministic (HD) wallets, the method comprising:
performing a measurement of one or more scale invariant biometric data associated with a user;
computing a repeatable biometric number from the measurement of one or more scale invariant biometric data associated with the user;
formatting the repeatable biometric number into a cryptographic seed, to create a biometric cryptographic seed for generation of one or more master cryptographic keys; and
computing the one or more master cryptographic keys from the biometric cryptographic seed.

11. The method of claim 10, wherein computing the one or more master cryptographic keys comprises processing the biometric cryptographic seed with a hash function.

12. The method of claim 10, wherein the measurement of the one or more scale invariant biometric data is performed by one or more biometric sensors integrated on a mobile device associated with the user.

13. The method of claim 12, wherein the biometric cryptographic seed is generated by one or more mobile applications stored on the mobile device, using the measurement of the one or more scale invariant biometric data from the one or more biometric sensors.

14. The method of claim 13, wherein the computing of the one or more master cryptographic keys from the biometric cryptographic seed is performed by the one or more mobile applications stored on the mobile device.

15. The method of claim 14, wherein the one or more master cryptographic keys, computed by the one or more mobile applications, is stored on a blockchain wallet.

16. The method of claim 15, where the blockchain wallet comprises an HD wallet.

17. The method of claim 13, wherein a distinct biometric cryptographic seed is dynamically generated for a distinct blockchain transaction and a corresponding one or more master cryptographic keys deleted upon completion of the blockchain transaction.

18. The method of claim 13, where the computing of the one or more master cryptographic keys from the biometric cryptographic seed is performed by one or more corresponding server applications communicatively coupled to the one or more mobile applications running on the mobile device.

19. The method of claim 10, wherein the biometric cryptographic seed comprises components derived from one or more of a knowledge-based data provided by the user and a secret data stored on a One Time Password (OTP) authentication card associated with the user.

20. A non-transitory computer-readable medium comprising instructions for execution by a computer hardware arrangement, wherein, upon execution of the instructions the computer hardware arrangement is configured to perform procedures comprising:
performing a measurement of one or more scale invariant biometric data associated with a user;
computing a repeatable biometric number from the measurement of one or more scale invariant biometric data associated with the user;
formatting the repeatable biometric number into a cryptographic seed, to create a biometric cryptographic seed for generation of one or more master cryptographic keys; and
computing the one or more master cryptographic keys from the biometric cryptographic seed.

* * * * *